United States Patent [19]

Borrman et al.

[11] Patent Number: 4,587,093
[45] Date of Patent: May 6, 1986

[54] NUCLEAR FUEL ASSEMBLY

[75] Inventors: Bo Borrman; Olov Nylund, both of Västerås, Sweden

[73] Assignee: AB Asea-Atom, Västerås, Sweden

[21] Appl. No.: 508,681

[22] Filed: Jun. 28, 1983

[30] Foreign Application Priority Data

Jul. 12, 1982 [SE] Sweden ................. 8204270

[51] Int. Cl.[4] .................. G21C 3/32; G21C 15/02
[52] U.S. Cl. ................. 376/444; 376/377; 376/434; 376/443
[58] Field of Search .......... 376/448, 434, 438, 441, 376/442, 440, 444

[56] References Cited

U.S. PATENT DOCUMENTS

| 3,122,484 | 2/1964 | Iskenderian . | |
|---|---|---|---|
| 3,205,144 | 9/1965 | Jabsen . | |
| 3,301,765 | 1/1967 | Eyre et al. | 376/442 |
| 3,481,021 | 12/1969 | Glandin et al. . | |
| 3,567,582 | 3/1971 | Dieuoet et al. . | |
| 3,719,560 | 3/1973 | Moyers et al. | 376/442 |
| 3,791,466 | 2/1974 | Patterson et al. | 376/441 X |
| 3,819,477 | 6/1974 | Fromel | 376/441 |
| 3,844,887 | 10/1974 | Georges et al. | 376/442 |
| 3,879,259 | 4/1975 | Persson et al. . | |
| 4,088,534 | 5/1978 | Andrieu et al. . | |
| 4,325,786 | 4/1982 | Wohlsen | 376/442 |
| 4,348,355 | 9/1982 | Nylund . | |
| 4,478,786 | 10/1984 | Andersson et al. . | |

FOREIGN PATENT DOCUMENTS

| 621561 | 12/1962 | Belgium . | |
|---|---|---|---|
| 648637 | 9/1964 | Belgium . | |
| 1150423 | 7/1983 | Canada | 376/444 |
| 0036142 | 9/1981 | European Pat. Off. | 376/444 |
| 0050836 | 5/1982 | European Pat. Off. . | |
| 0054827 | 6/1982 | European Pat. Off. . | |
| 1816561 | 8/1969 | Fed. Rep. of Germany . | |
| 2623430 | 12/1976 | Fed. Rep. of Germany . | |
| 3202238 | 9/1982 | Fed. Rep. of Germany | 376/442 |
| 1228851 | 9/1960 | France . | |
| 1246458 | 10/1960 | France . | |
| 2111642 | 6/1972 | France . | |
| 2146976 | 9/1973 | France | 376/438 |
| 0013894 | 2/1979 | Japan | 376/438 |
| 43767 | 7/1963 | Luxembourg . | |
| 334955 | 10/1971 | Sweden . | |
| 1341270 | 12/1973 | United Kingdom . | |
| 1411116 | 10/1975 | United Kingdom . | |
| 2054247 | 2/1981 | United Kingdom . | |

Primary Examiner—Charles T. Jordan
Assistant Examiner—Dan Wasil
Attorney, Agent, or Firm—Pollock, Vande Sande & Priddy

[57] ABSTRACT

A fuel asembly with a fuel channel (2) which surrounds a plurality of fuel rods (1) and which is divided, by means of a stiffening device (3) of cruciform cross-section and four wings (5), into four sub-channels (4) each of which comprises a bundle of fuel rods.

Each fuel channel side has a plurality of stamped, inwardly-directed projections (6) arranged vertically one after the other, said projections being welded to one and the same stiffening wing. Each one of the wall portions located between the projections (6) defines, together with two adjacently positioned projections and a portion of the stiffening wing, a communication opening between two bundles located on one side each of the stiffening wing.

6 Claims, 14 Drawing Figures

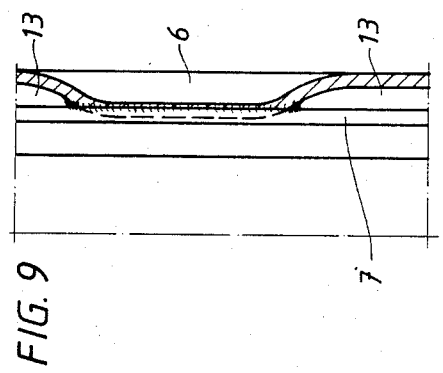
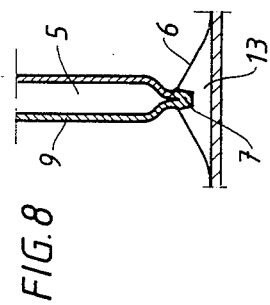
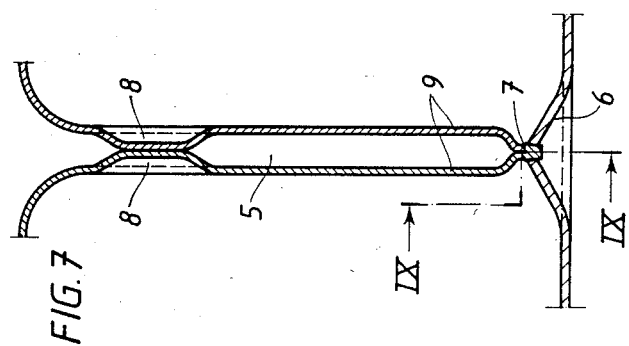
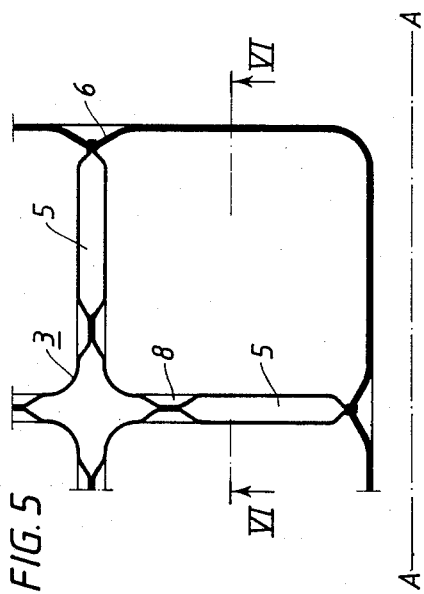
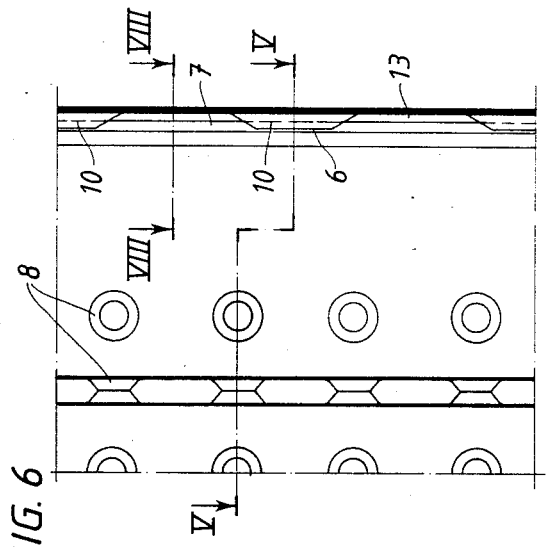

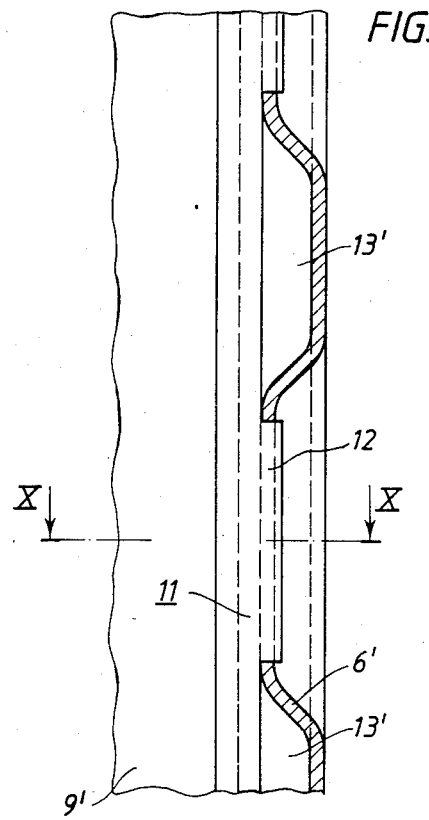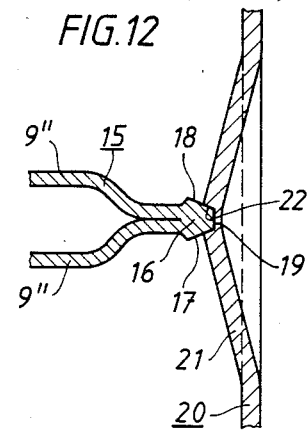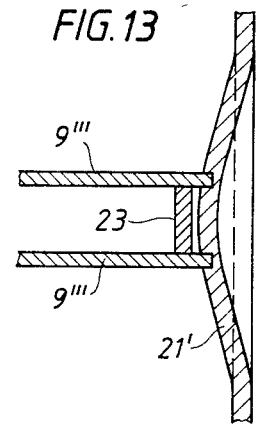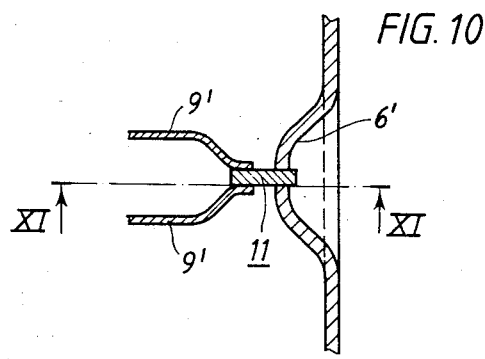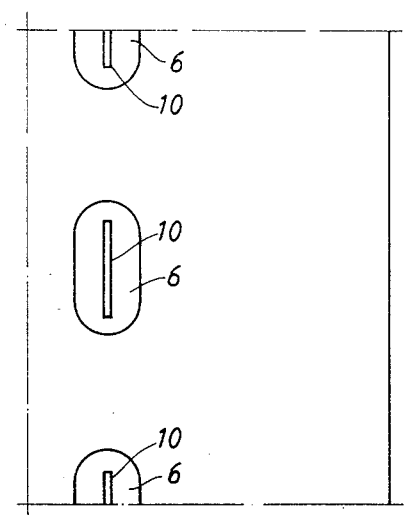

NUCLEAR FUEL ASSEMBLY

TECHNICAL FIELD

The present invention relates to a nuclear fuel assembly for a boiling reactor, comprising a plurality of fuel rods which are surrounded by a fuel channel having substantially rectangular cross-section, said fuel channel also surrounding an elongated stiffening device which at least extends along a greater portion of the length of the fuel rods, whereby the vertical centre line of said stiffening device lies in the vicinity of the vertical centre line of said fuel channel, said stiffening device having four stiffening wings which are arranged in vertical planes with a mutual angular distance of about 90°, said stiffening wings being mechanically connected to each other and to corresponding side walls of said fuel channel to prevent said fuel channel wall from deforming outwardly during reactor operation, said wings constituting partitions between four bundles of fuel rods and each of said wings comprising at least one vertical internal water passageway extending at least along a greater part of the length of the fuel rods, whereby a plurality of openings for hydraulic communication between mutually adjacent bundles in each one of said wings are arranged one above the other along at least one wing in the vicinity of a corresponding side wall of said fuel channel, a plurality of side wall portions, which are located in corresponding interspaces between two of the communication openings, being welded to one and the same stiffening wing.

DISCUSSION OF PRIOR ART

Fuel assemblies of the above kind are known from the published European patent application No. 0036142, in which one of the described fuel assemblies has four stiffening ridges, each extending along a fuel channel wall and along the whole fuel channel height. Each wing is mechanically connected to a corresponding ridge by means of a plurality of horizontally directed rivets, passed through the walls of the fuel channel, each rivet passing through a corresponding distance block arranged between the wing and the ridge. By arranging the distance blocks one above the other in spaced relationship, a plurality of hydraulic transverse connections between adjacently positioned fuel channels are obtained.

The above-mentioned patent application also describes a fuel assembly of the kind mentioned in the introduction of this description, which differs from the above-mentioned one by having a smaller number of components and in that the above-mentioned rivet joints have been replaced by stronger, welded joints. Further each stiffening wing includes two mutually parallel sheet metal elements, and each of the above-mentioned communication openings is a short transversal channel, partly defined by a half-collar obtained by bending an edge portion belonging to one of the sheet metal elements towards a correspondingly deformed edge portion belonging to the other sheet metal element, and welding these edge portions to each other.

DISCLOSURE OF THE INVENTION

The task that the invention seeks to solve is to produce a fuel assembly of the kind mentioned in the introduction, in which the above-mentioned communication openings are formed in such a way that considerable advantages from the manufacturing point of view are gained when comparing this fuel assembly with the above-mentioned known fuel assemblies.

In the latter of the known fuel assemblies mentioned above, communication openings have been provided by furnishing each stiffening wing with a plurality of indentations made near the corresponding fuel channel wall. In a fuel assembly according to the invention, these can be dispensed with since a plurality of communication openings have instead been provided by forming a vertically extending mid-portion of each fuel channel wall in such a way that a vertical section therethrough follows a wavy line.

According to a further development of the invention, a plurality of stamped, inwardly directed projections of the above-mentioned mid-portion are provided with vertical slits or slots, intended to take up corresponding portions of the stiffening wings, whereby a correct positioning of the stiffening device is facilitated.

BRIEF DESCRIPTION OF DRAWINGS

In the following the invention will be described with reference to the accompanying schematic drawings, wherein:

FIG. 1 shows a first embodiment of a fuel assembly according to the invention in a vertical section along I—I of FIGS. 2, 3 and 4 which show horizontal sections along, respectively, II—II, III—III and IV—IV of FIG. 1, whereas FIGS. 5, 6 and 6A show details of the fuel assembly shown in FIGS. 1-4;

FIG. 5 shows a horizontal section along V—V of FIG. 6, which shows a vertical section along VI—VI of FIG. 5;

FIG. 6A shows a side view perpendicular to a vertical plane through the line A—A of FIG. 5;

FIG. 7 shows a detail of FIG. 5 on an enlarged scale;

FIG. 8 shows a partial horizontal section along VIII—VIII of FIG. 6;

FIG. 9 shows a partial vertical section along IX—IX of FIG. 7;

FIGS. 10 and 11 show a second embodiment of the invention, whereby FIG. 10 shows a partial horizontal section through a projection stamped in one of the walls of a fuel channel. FIG. 11 shows a partial vertical section along XI—XI of FIG. 10, whereas FIG. 10 shows a partial horizontal section along X—X of FIG. 11.

FIG. 12 shows a detail of a third embodiment of the invention, whereby the detail is shown in the same way as that shown in FIG. 7 and is intended to replace the corresponding detail of FIG. 7 in a fuel assembly which differs from that shown in FIGS. 1, 2, 3, 4 only as regards the detail in question.

FIG. 13 shows, in the same way as FIG. 12, a detail of a fourth embodiment of the invention.

DESCRIPTION OF PREFERRED EMBODIMENTS

Figure 1:
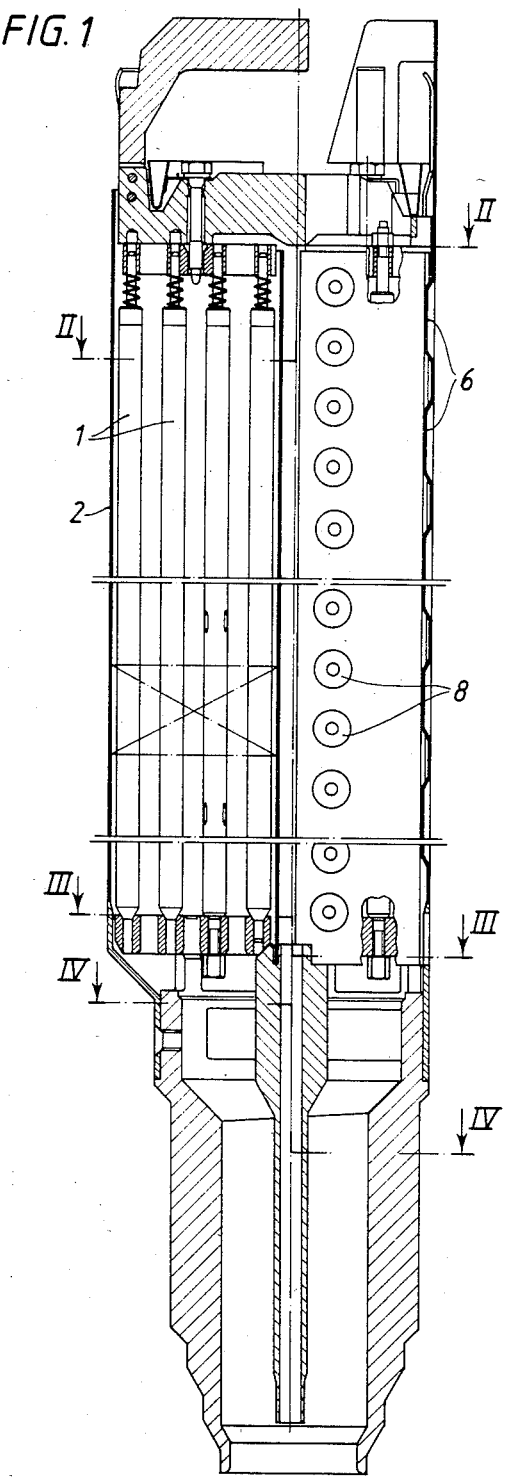
Figure 2:
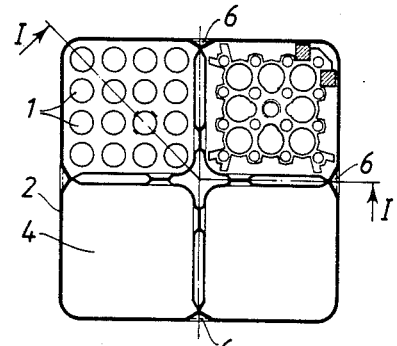
Figure 3:
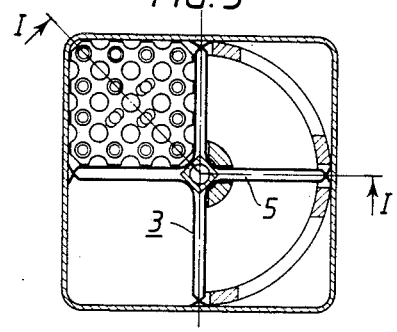
Figure 4:
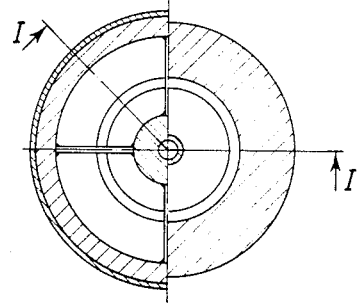

The fuel assembly shown in FIG. 1 comprises 64 vertical fuel rods 1, which are surrounded by a fuel channel 2 of substantially square cross-section, that is, a cross-section of the fuel channel has a circumference mainly coinciding with that of a square. The fuel channel 2 is divided, by means of a stiffening device 3 of substantially cruciform cross-section, into four sub-channels 4 which each contains a bundle of fuel rods. Each bundle comprises sixteen fuel rods. The stiffening device 3 is composed of four mutually equal, elongated sheet metal elements 9 made with L-shaped cross-section and extending at least along a greater part of the length of the fuel rods. Each sheet metal element 9 has a plurality of stamped projections 8, which make contact with corresponding projections 8 of adjacent sheet metal elements and are welded to these by means of spot welding. In addition, each sheet metal element 9 is welded to an adjacent sheet metal element 9 at each of its vertical edges. The stiffening device 3 is formed with four hollow stiffening wings 5, the extension of which in the vertical direction at least constitutes a greater part of the length of the fuel channel 2. Each wing has a straight, vertical outer edge which at a plurality of points is welded to a corresponding wall of the fuel channel 2. The stiffening member 3 constitutes a water tube made with a cruciform internal cross-section surface, which water tube is arranged to be traversed in the vertical direction by water which, because of a small void, has a great moderating effect. Each stiffening wing comprises at least one vertical channel which at least extends along a greater part of the length of the fuel rods.

Each side of the fuel channel has a plurality of projections 6, stamped in the sheet material of the fuel channel and arranged vertically one after the other, each projection having an inwardly facing convex surface and an outwardly facing concave surface. In each of the four walls of the fuel channel 2, each projection 6 is provided with a vertical, through-going slit 10, whereby a plurality of such slits are alined with each other along a vertical line. Nearest the fuel channel wall, each wing 5 has a vertically extending edge portion 7, the width of which is only a smaller part of the average horizontal dimension of the wing 5. Each edge portion 7 is inserted, without any mentionable play, into a plurality of vertical slits 10, each of which being provided in a corresponding stamped projection 6 in the fuel channel wall. The edge portion 7 is welded to the projections 6 by means of an electric arc applied on the outer side of the fuel channel wall, preferably without any additional material, i.e. by fusing together sheet material belonging to a fuel channel wall and sheet material belonging to a stiffening wing 5. Each of these materials is a zirconium alloy of a kind generally used for nuclear reactor purposes.

In each interspace between two stamped projections 6 there is arranged, between the edge portion 6 and the fuel channel wall, a hydraulic transverse connection between mutually adjacently positioned sub-channels 4 in the form of a communication opening 13 which is defined by means of the edge portion 7, a plane wall portion of the fuel channel wall, and by means of two surface portions belonging to convex surfaces of corresponding projections 6.

The embodiment shown in FIGS. 10 and 11 differs from that described above substantially only in that the stiffening member with cruciform cross-section has a different structure as regards the portions located nearest the walls of the fuel channel. The cruciform channel member is composed of four sheet metal elements 9' made with L-shaped cross-section, which sheet metal elements are welded at their vertical edges to an intermediate vertical sheet strip 11 having approximately the same length as the fuel channel of the fuel assembly. The sheet strip 11 has a plurality of horizontal projections 12, which are each inserted into a corresponding vertical slot in a corresponding embossed projection 6'. Since the radial projections 12 have approximately the same vertical dimension as the slots, a mechanical connection is obtained which facilitates the assembly and which, together with the welding seams along the vertical gap, provides a very reliable attachment.

In the embodiment shown in FIGS. 10 and 11, it is necessary, when mounting the supporting device, to subject the walls of the fuel channel to elastic deformation.

In FIG. 12, the numeral 15 designates a stiffening wing which, in the same way as the stiffening wing 5, is composed of sheet metal portions belonging to a corresponding sheet metal element made with L-shaped cross-section. Said sheet metal elements are designated 9" in FIG. 12. The stiffening wing 15 has an outer vertically extending edge portion 16, in which the two sheet metal elements 9" are welded to each other. The edge portion 6 extends vertically along at least a greater part of the vertical extension of the fuel channel and is defined, along its entire length, by means of three surfaces 17, 18, 19, each lying in a vertical plane, whereby the surfaces 17 and 18 diverge with each other in a direction towards the vertical mid-axis of the fuel assembly. The fuel channel wall 20 located nearest the stiffening wing 15 is provided with a plurality of projections 21 stamped in the wall. These are substantially designed and arranged in the same way as the projections 6 described above, with the only difference that the projections 21—instead of being provided with a vertical slit each—are each provided with a vertical slot 22, the outer edge portion 16 then being inserted into a plurality of such slots. In each of the slots 22, the edge portion 16 is welded to the fuel channel wall 20 by a wall portion, facing the surface 19, being melted through by means of an arc. The metal in the stiffening wing 15 is fused with the metal in the fuel channel wall. In both cases the metal consists of a zirconium alloy suitable for nuclear reactor purposes.

The slot 22 may suitably be stamped or punched while at the same time the projection 21 is formed in the fuel channel by means of stamping. The slot 22 can also be made with a depth which is very small in relation to the thickness of the fuel channel wall, or it may be completely omitted, in which case the sheet material of the projection 21 is melted through in its entire thickness by means of an arc applied on the concave side of the projection.

FIG. 13 shows an alternative to the detail shown in FIG. 12, whereby 9''' designates two sheet metal elements which only deviate from the sheet metal elements 9" as regards the design of the portions located nearest the fuel channel walls. The projection 21' has two vertical slots adjacent each other, the sheet metal elements 9''' being each welded in a slot by means of an arc applied on the outside of the fuel channel.

We claim:

1. A fuel assembly for a boiling water nuclear reactor, said fuel assembly comprising a plurality of fuel rods surrounded by a fuel channel separate from said fuel rods, said fuel channel being of substantially rectangular cross-section; an elongated stiffening device surrounded by said fuel channel, said stiffening device being separate from said fuel rods and extending along a greater part of the length of said fuel rods, the vertical center line of said stiffening device lying in the vicinity of the vertical center line of said fuel channel, said stiffening device having four stiffening wings arranged in vertical planes and having angular distances of about 90° between themselves, said stiffening wings being connected to each other and to corresponding sidewalls of said fuel channel to prevent said fuel channel from deforming outwardly during reactor operation, said wings constituting partitions between four bundles of fuel rods and each of said wings having at least one vertical internal water passageway extending along a greater part of the length of said fuel rods such that water flowing upward through said internal water passageway is prevented from contacting said fuel rods so as to minimize the void content of the water in said internal water passageway and maximize its moderator effect; and a plurality of transverse channels for hydraulic communication between adjacent fuel rod bundles arranged one above the other along at least one of said wings in the vicinity of a corresponding sidewall of said fuel channel, said sidewall having a plurality of projections stamped in said sidewall one above the other in vertically spaced relationship along a vertically extending mid-portion of said sidewall such that a vertical section through said mid-portion follows a wavy line, each of said stamped projections having a radially inwardly facing convex side and a radially outwardly facing concave side and each of said stiffening wings comprising two vertical sheet portions arranged to define part of said internal water passageway therebetween and having a straight vertical edge portion in which said sheet portions are united by welding, said edge portion extending along a greater part of the vertical extent of said fuel channel and being welded directly to said stamped projections by means of a linear, vertically extending welded zone disposed along a portion of each of said projections at said concave side, each of said transverse hydraulic channels being defined by means of a planar wall portion existing between a pair of adjacent stamped projections, by means of an inwardly facing surface portion of each of said adjacent projections, and by means of a portion of said straight vertical edge portion.

2. A fuel assembly according to claim 1, wherein each of said stamped projections, by means of arc welding, is fastened to said stiffening wing along a corresponding welded zone, and in which said fuel channel wall is melted through and material belonging to said stamped projections is united with material belonging to said straight vertical edge portion.

3. A fuel assembly according to claim 1, wherein each of said stamped projections is furnished with at least one vertical slot, and said slots of said plurality of stamped projections are aligned vertically along said sidewall and arranged to receive corresponding portions of said straight vertical edge portion without substantially transversal play.

4. A fuel assembly for a boiling water nuclear reactor, said fuel assembly comprising a plurality of fuel rods surrounded by a fuel channel separate from said fuel rods, said fuel channel being of substantially rectangular cross-section; an elongated stiffening device surrounded by said fuel channel, said stiffening device being separate from said fuel rods and extending along a greater part of the length of said fuel rods, the vertical center line of said stiffening device lying in the vicinity of the vertical center line of said fuel channel, said stiffening device having four stiffening wings arranged in vertical planes and having angular distances of about 90° between themselves, said stiffening wings being connected to each other and to corresponding sidewalls of said fuel channel to prevent said fuel channel from deforming outwardly during reactor operation, said wings constituting partitions between four bundles of fuel rods and each of said wings having at least one vertical internal water passageway extending along a greater part of the length of said fuel rods such that water flowing upward through said internal water passageway is prevented from contacting said fuel rods so as to minimize the void content of the water in said internal water passageway and maximize its moderator effect; and a plurality of transverse channels for hydraulic communication between adjacent fuel rod bundles arranged one above the other along at least one of said wings in the vicinity of a corresponding sidewall of said fuel channel, said sidewall having a plurality of projections stamped in said sidewall one above the other in vertically spaced relationship along substantially a vertically extending mid-portion of said sidewall such that a vertical section through said mid-portion follows a wavy line, each of said stamped projections having an inwardly facing convex side and an outwardly facing concave side and each of said stiffening wings comprising two vertical sheet portions arranged to define part of said internal water passageway therebetween and having vertical straight edges extending along a greater part of the vertical extent of said fuel channel, said edges being welded to a vertical sheet strip along their entire length, said sheet strip having a plurality of radially directed wing projections, each of said stamped projections having a through-going aperture in which a corresponding wing projection is inserted without substantial horizontal play and the radial extent of each of said wing projections being such that elastic deformation of said sidewall is required for insertion or removal of said wing projection relative to said aperture, each of said wing projections being welded directly to said stamped projections by means of a welding operation applied to each of said stamped projections at said concave side, and each of said transverse hydraulic channels being defined by means fo a planar wall portion existing between a pair of adjacent stamped projections, by means of an inwardly facing surface portion of each of the same pair of adjacent stamped projections, and by means of a portion of said vertical sheet strip.

5. The fuel assembly of claim 1 in which said at least one stiffening wing is welded to at least three of said stamped projections.

6. The fuel assembly of claim 5 in which said sidewall mid-portion extends vertically along a greater part of the length of said fuel rods.

* * * * *